Oct. 17, 1950  P. H. STAAFF  2,526,292
CONTINUOUS PRODUCTION OF BUTTER FROM SOUR CREAM
Filed May 3, 1949
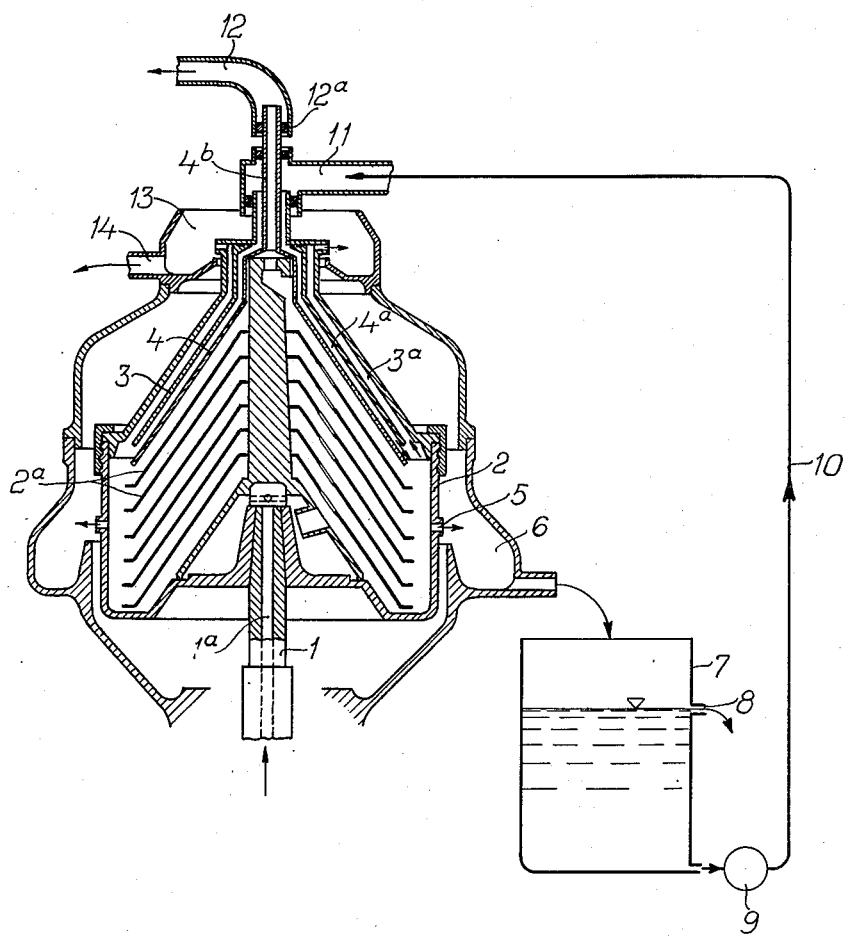
INVENTOR.
Per Hilding Staaff
BY
Davis, Hoxie & Faithfull Patented Oct. 17, 1950

2,526,292

UNITED STATES PATENT OFFICE 2,526,292

CONTINUOUS PRODUCTION OF BUTTER FROM SOUR CREAM

Per Hilding Staaff, Alsten, Sweden, assignor to Aktiebolaget Separator, Stockholm, Sweden, a corporation of Sweden Application May 3, 1949, Serial No. 91,128
In Sweden May 3, 1948

9 Claims. (Cl. 99—119)

This invention relates to the continuous production of butter from sour cream, and more particularly to an improved process by which highly concentrated cream suitable for conversion into butter can be produced continuously from sour cream of lower concentration.

In remote districts from which milk products cannot be transported daily to a dairy, it is common practice to produce cream at the farm by centrifugal separation of the whole milk, and to store the cream until a sufficient quantity is accumulated to enable economical transport to the dairy. In these circumstances, it is unavoidable that the cream delivered to the dairy is more or less sour. This cream is used by the dairy for the production of butter. However, the quality of such butter is generally very uneven because the cream received from the farmers is of varying fat content and also of widely varying acidity. Another inconvenience is that such cream could not heretofore be successfully used for continuous butter production, because of the difficulty to produce, by re-separation, the highly concentrated cream required for continuous butter production.

The principal object of the present invention is to provide a process for continuous butter production from sour cream, by which the inconveniences referred to above are avoided.

According to the invention, the sour cream, which should preferably have a fat content of 20 to 45%, is wholly or substantially neutralized in the usual manner. It is then concentrated to a fat content of 80 to 85% by centrifugal separation in a nozzle type separator having provision for closed (air-tight) or substantially closed discharge of at least the lighter component, whereupon the highly concentrated cream is converted into butter by rapid cooling to effect the phase conversion. The neutralized cream may also be pasteurized (that is, heated to, for example, 85 to 90° C.) prior to the concentration. After the pasteurizing, the cream should be cooled to a suitable separating temperature, for example, 55 to 60° C., before being fed to the centrifugal separator. By using a nozzle type centrifuge, the separation may be carried out as a continuous operation over a practically unlimited period, because those constituents of the cream which are normally retained in the sludge space, and of which there is a relatively large amount in neutralized cream, discharge through the nozzles or openings provided in the wall of the separator bowl. Thus, there is no risk of clogging of the bowl. Because of the low viscosity of the separated sludge, the wall of the separator bowl may be wholly cylindrical, making it possible to keep the separating efficiency of the bowl high. In order to maintain the cream level in the bowl at a predetermined position, the centrifuge is preferably provided with means for recirculation of at least some of the sludge discharging through the nozzles, the sludge thereby being returned to the sludge space of the bowl.

In continuous butter production of the character described, I have found that it is of vital importance to concentrate the cream in a centrifugal bowl having permanently open nozzles for the discharge of the sludge. When a separator bowl of the so-called self-opening type is used for this purpose, that is, a separator bowl in which the sludge discharge openings are intermittently uncovered for the removal of sludge from the bowl, the separating process is disturbed each time the bowl is opened for sludge discharge. Accordingly, it is impossible to obtain the constant conditions necessary for the production of highly concentrated cream having the exact or fixed fat content which is required when the highly concentrated cream is to be fed from the separator directly to a refrigerating device where the phase conversion into butter takes place.

In the accompanying drawing, the single illustration is a somewhat schematic view of an apparatus for use in practicing the process, the centrifuge for final concentration of the cream being shown in vertical section, and the recirculation means being shown diagrammatically.

Referring to the drawing, the axle or spindle 1 of the centrifugal separator has a central passage 1a forming an inlet through which the neutralized cream to be concentrated is fed into the separating chamber or locus of centrifugal force in the bowl 2. The separator bowl 2 contains two top discs 3 and 4 which, together with the bowl shell, form two channels 3a and 4a. The channel 3a serves as an outlet for the skim milk, and the channel 4a serves as an inlet for the recirculated sludge-containing liquid. In the cylindrical wall of the separator bowl, at the outer periphery of the centrifugal locus, are nozzles or openings 5 through which the separated sludge and a certain amount of liquid (skim milk) are discharged into a stationary collecting chamber 6 in the separator frame. From chamber 6 the sludge-containing liquid is led to a receptacle 7, from which part of it is withdrawn from the system over a level outlet 8. By means of a pump 9 and a pipe 10, the remainder of the sludge-containing liquid is returned to an inlet 11 communicating with the channel 4a. By regulating the rate at which the sludge-containing liquid is thus returned, a suitable concentration of the sludge-containing liquid discharging through the nozzles 5 can be obtained. At the same time, a relatively high rate of liquid flow can be maintained in the nozzles 5 without any risk that cream or skim milk in excessive amounts may discharge through the nozzles. It will be understood that it is possible, and in some instances desirable, to feed water or other liquid through the inlet 11 in place of or in addition to the sludge-containing liquid as described.

The neutralized cream fed into the centrifugal locus 2 is there separated into three components comprising, in addition to the heavy or sludge-containing component discharged through the peripheral outlets 5, an intermediate component primarily skim milk, and a light component which is primarily cream concentrated to a fat content of 80–85%. The highly concentrated cream passes between the usual conical discs 2a to the inner part of the centrifugal locus, and from there passes upward through an axial outlet formed by a neck 4b on the top disc 4. From the neck 4b, the concentrated cream discharges into a stationary pipe 12, there being an airtight seal 12a between this pipe and the neck 4b to exclude air from the discharging cream. In this way the separated cream is prevented from coming into contact with the air. The skim milk component is discharged through the intermediate outlet provided by channel 3a and is collected in an open vessel 13 on the separator, whence it is discharged through an outlet 14.

The highly concentrated cream is led through the cream pipe 12 directly to a refrigerating device which may be of any conventional construction. Between the separator and the refrigerating device, devices for adding salt and/or aromatics to the cream may be provided. These devices may, for example, consist of a container with an agitator through which the cream is passed, as well as dosing devices cooperating with the container.

I claim:

1. In the continuous production of butter from sour cream, the process which comprises substantially neutralizing the cream, feeding the neutralized cream to a locus of centrifugal force within a cylindrical outer wall thereof and there separating it into a concentrated cream component having a fat content of 80 to 85%, and a heavier component containing sludge separated from the cream, continuously discharging the sludge-containing component through openings in the cylindrical outer wall of the locus, continuously discharging the concentrated cream from the inner part of said locus while excluding air from the discharging cream, and converting the discharged cream concentrate into butter.

2. The process according to claim 1, in which the discharged cream concentrate is converted into butter by rapid cooling of the cream to effect the phase conversion.

3. The process according to claim 1, in which the neutralized cream is pasteurized before it is fed to said locus.

4. The process according to claim 1, in which, prior to said separation, the neutralized cream is pasteurized, then cooled to a separating temperature, and then immediately fed to said locus.

5. The process according to claim 1, comprising also the step of recirculating to the peripheral portion of the locus at least part of the sludge-containing component discharged from the locus.

6. The process according to claim 1, comprising also the step of adding salt to the discharged cream concentrate before it is converted into butter.

7. The process according to claim 1, comprising also the step of adding aromatics to the discharged cream concentrate before it is converted into butter.

8. In the continuous production of highly concentrated cream from sour cream, the process which comprises substantially neutralizing the cream, feeding the neutralized cream to a locus of centrifugal force within a cylindrical outer wall thereof and there separating it into three components, namely, a light component primarily concentrated cream, an intermediate component primarily skim-milk, and a heavy component primarily sludge-containing liquid, continuously discharging said sludge component through openings in the cylindrical outer wall of the locus, continuously discharging the skim-milk component through an intermediate outlet from the locus, and continuously discharging the concentrated cream through an outlet at the inner part of the locus while excluding air from the discharging cream.

9. The process according to claim 8, comprising also the step of recirculating to the peripheral portion of the locus at least part of the sludge component discharged from the locus.

PER HILDING STAAFF.

REFERENCES CITED

The following references are of record in the file of this patent:

UNITED STATES PATENTS

| Number | Name | Date |
|---|---|---|
| 1,977,927 | Wendt | Oct. 23, 1934 |
| 2,168,376 | Van der Meulen | Aug. 8, 1939 |
| 2,414,837 | Riggs | Jan. 28, 1947 |

OTHER REFERENCES

"The Butter Industry," by Hunziker, third edition, published by the author, La Grange, Illinois (1940), pages 168–173.